United States Patent [19]
Saito

[11] Patent Number: 4,724,004
[45] Date of Patent: Feb. 9, 1988

[54] COATING COMPOSITION
[75] Inventor: Nobuhiro Saito, Ohta, Japan
[73] Assignee: Toshiba Silicone Co., Ltd., Japan
[21] Appl. No.: 897,684
[22] Filed: Aug. 18, 1986
[30] Foreign Application Priority Data Aug. 23, 1985 [JP] Japan .................. 85/184068

[51] Int. Cl.$^4$ .............................................. C09K 3/00
[52] U.S. Cl. .......................... 106/287.12; 106/287.14
[58] Field of Search .................. 106/287.14, 287.12

[56] References Cited
U.S. PATENT DOCUMENTS

| | | | |
|---|---|---|---|
| 4,242,250 | 12/1980 | Gagnon et al. | 260/33.4 |
| 4,413,025 | 11/1983 | Haga et al. | 524/300 |
| 4,423,108 | 12/1983 | Kalinowski et al. | 428/266 |
| 4,476,281 | 10/1984 | Vaughn | 106/287.14 |
| 4,639,489 | 1/1987 | Aizawa et al. | 524/588 |

Primary Examiner—Theodore Morris

[57] ABSTRACT

A coating composition which is intended to improve surface hardness of plastics materials comprising components:
(A) 5 to 45% by weight of an organosilanetriol expressed by the formula $R^1Si(OH)_3$, wherein $R^1$ represents a monovalent hydrocarbon group, and/or a partial condensate thereof;
(B) 45 to 5% by weight as solids of colloidal silica; and
(C) 40 to 60% by weight of a solvent containing an aliphatic alcohol having from 1 to 6 carbon atoms, and/or ethylene glycol monoethyl ether acetate, in an amount such that the total of the above components is 100 parts by weight, and mixed therein
(D) a catalyst dispersion containing 0.1 to 5 parts by weight of a compound expressed by the formula $(R^2)_4NOCHO$, wherein $R^2$ can be the same or different and represents an alkyl group having carbon number of from 1 to 2, and 100 parts by weight of an aliphatic alcohol having carbon number of from 1 to 6, so long as the compound expressed by the formula $(R^2)_4NOCHO$ is 0.1 to 0.5% by weight to the total solids in the components (A) and (B).

4 Claims, No Drawings

COATING COMPOSITION

The present application claims priority of Japanese patent application Ser. No. 85/184068 filed Aug. 23, 1985.

BACKGROUND OF THE INVENTION

The present invention relates to a coating composition capable of forming, in short cure times and at low temperatures, a transparent protective film having appropriate surface hardness, excellent heat resistance, excellent weathering resistance and good adhesion to the surface of plastic materials and the like.

Plastics have a number of excellent properties that are not found in other materials in that they are light, tough and easy to process. Because of such advantags, plastics have been applied in a variety of fields, and further, due primarily to the development of engineering plastics, they are now being applied even in fields where application thereof has heretofore been impossible. However, while plastics have the above mentioned advantages, they also have disadvantages such as low surface hardness, poor heat resistance, poor weathering resistance and solvent resistance.

In order to overcome such problems, various attempts have been made to develop compositions which can be applied onto the surface of a plastic substrate to improve the surface hardness thereof. Among such compositions, there has been suggested a colloidal silica containing silicone coating composition which is characterized by excellent mechanical properties as a cured film (Japanese Patent Publication Kokai No. 56/125466 (1981)). However, in the coating of plastics using such a composition, the cure times are undesirably long, about 1 hour of heating, and the cure temperatures are undesirably high, about 120° C. Accordingly, use of such a composition is sometimes difficult depending on the heat resistance of the plastic substrate and the expense of curing equipment particularly in the case of equipment for continuous curing.

As a method to overcome the disadvantages, there has been proposed a method to add a fatty acid salt of an alkali metal as a curing catalyst to the above mentioned composition. However, in this method, there are problems that the heat resistance and the weathering resistance of the resulting film are insufficient. The film becomes opaque easily upon exposure to high temperature or upon exposure to prolonged outdoor weathering. Further, if too much curing catalyst is utilized, the film may crack during heat cure.

On the other hand, there is a method where an ammonium hydroxide or amines are used as the curing agent for the above mentioned composition. However, in such a method the storage stability of the composition obtained is poor and orange peel may occur upon heat curing. This makes it difficult to obtain a transparent film. Because of such reasons, it has been impossible to use said coating agent in a continuous dip coating and curing line.

In addition to the above methods, there has been proposed a method, wherein the condensate of alkyltrialkoxysilane hydrolysate is cured using tetramethylammonium hydroxide catalyst without incorporating colloidal silica into the composition (Japanese Patent Pulication Kokai No. 57/38863 (1982)). However, the strength of the film obtained by this method is weaker than the film obtained in combination with colloidal silica. In an abrasion resistance test, the former film shows only $\frac{1}{3}$ to $\frac{1}{4}$ of the surface hardness of the latter. Moreover, in this method the curing requires long cure times and high temperature such as from 4 to 5 hours at 90° to 100° C.

Thus, as described above, it has heretofore been impossible to obtain a film having appropriate surface hardness, excellent heat resistance, excellent weathering resistance and good adhesion to plastic substrates using low cure temperatures and short cure times.

SUMMARY OF THE INVENTION

The present invention is directed to a coating composition capable of forming a film having appropriate surface hardness, excellent heat resistance, excellent weathering resistance and good adhesion to platic substrates using low cure temperatures and short cure times, and further having good storage stability and being applicable to continuous dip coating and curing.

As the result of the present inventor's extensive studies to attain the above objectives, it was found that the storage stability of the coating composition can be increased and curing properties thereof improved by utilizing a catalyst dispersion obtained by dipersing a compound expressed by the formula $(R^2)_4NOCHO$ (described later) in an aliphatic alcohol having from 1 to 6 carbon atoms.

DETAILED DESCRIPTION OF THE INVENTION

The coating composition of the present invention comprises the following components:
(A) 5 to 45% by weight of an organosilanetriol expressed by the formula $R^1Si(OH)_3$, where in $R^1$ represents a monovalent hydrocarbon group, and/or a partial condensate thereof;
(B) 45 to 5% by weight as solids of colloidal silica; and
(C) 40 to 60% by weight of a solvent containing an aliphatic alcohol having from 1 to 6 carbon atoms, and/or ethylene glycol monoethyl ether acetate, in an amount such that the total of the above components is 100 parts by weight, and mixed therein
(D) a catalyst dispersion containing 0.1 to 5 parts by weight of a compound expressed by the formula $(R^2)_4NOCHO$, wherein $R^2$ can be the same or different and represents an alkyl group having carbon number of from 1 to 2, and 100 parts by weight of an aliphatic alcohol having carbon number of from 1 to 6, so long as the compound expressed by the formula $(R^2)_4NOCHO$ is 0.1 to 0.5% by weight of the total solids in the components (A) and (B).

In component (A) of the present invention, $R_1$ represents a monovalent hydrocarbon group exemplified by methyl, ethyl, propyl, butyl, vinyl, allyl, etc., typically methyl. The partial condensate thereof is obtained, for example, by hydrolyzing an organotrialkoxysilane in an aqueous dispersion of colloidal silica. The amount of component (A) is 5 to 45% by weight of the total amount of components (A), (B) and (C). In the case where the amount is less than 5% by weight, flexibility of the cured film is lowered to cause cracking easily; whereas in the case where the amount exceeds 45% by weight, surface hardness of the cured film is notably lowered.

Colloidal silica (B) is usually used in the form of an aqueous dispersion. Such a dispersion is exemplified by Snowtex (tradename, produced by Nissan Chemical Industries Ltd.), Ludox (tradename, produced by E.I. Du Pont de Nemours and Co.), etc. The colloidal silica may either be acidic or basic. The amount of colloidal silica as solids is 45 to 5% by weight of the total amount of components (A), (B) and (C). In the case where the amount is less than 5% by weight, the surface hardness of the cured film is not sufficient and the cure speed is slow; whereas in the case where the amount exceeds 45% by weight, the cured film becomes less flexible and tends to form cracks upon heating or deforming.

As solvent (C) the following are exemplified: an aliphatic alcohol having from 1 to 6 carbon atoms such as methanol, ethanol, n-propanol, isopropanol, n-butanol, isobutanol, diacetone alcohol, ethylene glycol monoethyl ether or ethylene glycol monoethyl ether acetate; preferably isobutanol, diacetone alcohol or ethylene glycol monoethyl ether. In order to control the evaporation speed of the coating composition and improve adhesion of cured film to the substrate, it is preferred to use ethylene glycol monoethyl ether acetate in combination with an aliphatic alcohol mentioned above. The amount of solvent is 40 to 60% by weight of the total amount of components (A), (B) and (C). In the case where the amount is less than 40% by weight, leveling of the coating composition is poor so that the cured film tends to form cracks upon prolonged heating; whereas in the case where the amount exceeds 60% by weight, sufficient film thickness (3 to 10μ) is not obtained and abrasion resistance of the coating is lowered.

Catalyst dispersion, (D), contains a compound represented by the formula $(R^2)_4NOCHO$ which is homogeneously dispersed in an aliphatic alcohol having from 1 to 6 carbon atoms. The catalyst dispersion has the effect of reducing cure time to make film without giving any of the disadvantages regarding storage stability of the coating composition, heat resistance, weathering resistance and adhesion of the cured film $R^2$ in the above formula is exemplified by methyl group or ethyl group. However, because of the favorable degree of catalyst activity, methyl group is preferred. An aliphatic alcohol having from 1 to 6 carbon atoms may be exemplified by methanol, ethanol, n-propanol, isopropanol, n-butanol, isobutanol, diacetone alcohol, ethylene glycol monoethyl ether, etc., preferably isopropanol, isobutanol, diacetone alcohol or ethylene glycol monoethyl ether.

The amount of the above metioned compound is from 0.1 to 5 parts by weight, preferably from 0.5 to 2 parts by weight to 100 parts by weight of the alcohol to be employed. In the case where the amount is less than 0.1 parts by weight, solids content in the coating composition decreases due to the fact that the amount of catalyst dispersion added to the coating composition increases, leaving insufficient film thickness on coating. When the amount exceeds 5 parts by weight, the cured film shows low heat resistance and weathering resistance because the dispersion of the catalyst in the coating composition becomes poor.

The amount of the catalyst to be added is from 0.1 to 0.5 parts by weight of the compound as expressed by the formula $(R^2)_4NOCHO$ to 100 parts by weight of the total solids of the components (A) and (B). In the case where the amount is less than 0.1 part by weight, sufficient film hardness of the cured film is not obtained; whereas in the case where the amount exceeds 0.5 part by weight, orange peel occurs on the cured film.

The coating composition of the present invention is obtained, for example, according to the following procedure. First, a predetermined amount of organotrialkoxysilane and colloidal silica are condensed by adding an appropriate hydrolysis catalyst (e.g., acetic anhydride or glacial acetic acid). Next, an aliphatic alcohol with small carbon number is added and azeotropically distilled off in order to remove the excessive water coming from the aqueous dispersion of colloidal silica. After adjusting the solids content with solvent including aliphatic alcohol, the pH of the composition is adjusted to neutral and the composition is aged for several weeks. Finally, the catalyst dispersion is added to the composition to give the coating composition.

In order to obtain a cured film from the present coating composition, first, a degreased plastic article is coated with a primer, followed by heat drying. The coating composition is subsequently applied thereon, followed by heat curing. As coating methods for primer and coating composition there may be used, for example, dip coating, spray coating, flow coating or roll coating. Cure temperature may not exceed the heat distortion temperature of the substrate and is usually 60° to 140° C. over 60 minutes, preferably 80° to 120° C. over 10 minutes.

In the present composition, because catalyst is added in the form of an alcohol dispersion, catalyst activity is improved. As a result, the present coating composition is favorable for continuous dip coating and curing because the coating composition after catalyst addition shows excellent storage stability. Further, when the present composition is applied, a film having appropriate surface hardness, excellent heat resistance, excellent weathering resistance and good adhesion to substrates is obtained at relatively low cure temperatures and over short cure times.

EXAMPLES OF THE INVENTION

In the Examples part(s) means part(s) by weight unless otherwise specified.

EXAMPLE 1

Preparation of catalyst dispersion 1.8 parts of formic acid were added dropwise to 10 parts of 30% aqueous solution of tetramethyl ammonium hydroxide in a reaction vessel. The resulting mixture, the temperature of which had risen due to the heat of reaction, was cooled down to 30° C., and its pH was adjusted to 6 by the further addition of a small amount of formic acid. To the resulting solution were added 400 parts of isopropyl alcohol to make catalyst dispersion having 1% by weight of catalyst. The resulting mixture was filtrated through a filter paper for use.

Preparation of coating composition

To a reaction vessel were charged 300 parts of colloidal silica "Snowtex C" (20% solids, produced by Nissan Chemical Industries, Ltd.; trade name), 320 parts of methyltriethoxysilane and 0.5 part of acetic anhydride. The resulting mixture was subjected to reaction with stirring at 25° C. to 30° C. for 24 hours. Subsequently, 320 parts of ethanol were added and the water in the vessel was removed as an ethanol-water azeotrope at 25° to 50° C. and at 20 to 150 mmHg. 160 parts of isobutanol and 160 parts of ethylene glycol monoethyl ether acetate were added to adjust the solids content; and the pH was adjusted to 7.0 by addition of ammonia water. After aging the resulting composition at room temperature for two weeks, 25 parts of the catalyst dispersion prepared above were added thereto per 100 parts of the solids in the composition to prepare a coating composition.

Preparation of primer

To a reaction vessel were charged 10 parts of granular polymethyl methacrylate "DIANAL BR85" (tradename, produced by Mitsubishi Rayon Co. Ltd.) and 200 parts of ethylene glycol monoethyl ether, whereupon the resulting mixture was heated at 80° to 120° C. with stirring. To the resulting mixture were added 40 parts of diacetone alcohol to adjust the solids content to 4%, followed by filtration to prepare a primer.

Coating

The surfaces of a polycarbonate sheet with 2 mm thickness were well degreased, and were flow-coated with the above prepared primer. The primer coated plate was immediatedly placed in a hot-air oven and dried by heating at 120° C. for 5 minutes. Then, the coating composition prepared above was applied thereto by means of flow coating, and the plate was immediately placed in the hot-air oven at 120° C. for 5 minutes. A cured plastic film, on the polycarbonate sheet, was obtained.

EXAMPLE 2

The procedure of Example 1 was repeated except that the curing condition of the coating composition was 30 minutes at 80° C. in place of 5 minutes at 120° C.

EXAMPLE 3

The procedure of Example 1 was repeated except that the amount of catalyst dispersion added to the coating composition was 50 parts in place of 100 parts.

COMPARATIVE EXAMPLE 1

The procedure of Example 1 was repeated except that 0.5 part of tetraethyl ammonium hydroxide was added to the coating composition in place of 50 parts of the catalyst dispersion.

COMPARATIVE EXAMPLE 2

The procedure of Comparative Example 1 was repeated except that the curing condition of the coating composition was 30 minutes at 80° C. in place of 5 minutes at 120° C.

COMPARATIVE EXAMPLE 3

Preparation of coating composition

To a reaction vessel were charged 770 parts of methyltriethoxylsilane, 230 parts of water and 5 parts of 0.1N hydrochloric acid, and the resulting mixture was subjected to reaction with stirring at 70° C. to 80° C. for 5 hours. Subsequently, 320 parts of ethanol as azeotrope former were added, and the excessive water was removed following the procedure of Example 1. Solids content was adjusted to 20% with ethanol. Next, 25 parts of the catalyst dispersion prepared in Example 1 were added thereto per 100 parts of the solids in the above prepared composition to complete the coating composition.

Coating

The procedure of Example 1 was repeated except that the coating composition was that which was prepared in Comparative Example 3.

COMPARATIVE EXAMPLE 4

The procedure of Example 1 was repeated except that the catalyst dispersion was not added to the coating composition.

Evaluation tests and results

The cured films obtained in Examples 1 to 3 and Comparative Examples 1 to 4 were evaluated for appearance, haze value after Taber abrasion test, adhesion to substrate and appearance after heat resistance test. Further, the storage stability of the coating compositions obtained in the Examples and Comparative Examples was evaluated. The results are shown in Table I.

Test method

Appearance of cured film:
  Visually observed after curing and cooling down to room temperature.
Haze value after Taber abrasion test:
  Degree of haze ΔH (%) on the sample surface was determined by Direct-Read Haze Computer (tradename: produced by Suga Test Instruments Co.) after Taber abrasion test under conditions of CS-10 abrasion wheels, 500 g loading and 500 abrasion cycles. The smaller ΔH is, the higher the abrasion resistance is.
Adhesion property:
  A lattice pattern with eleven cuts in each direction was made spacing each cut 1 mm apart in the cured film to the substrate, cellophane adhesive tape was applied over the lattice and then removed, and adhesion was evaluated by counting number of 1 mm square film remained on the substrate.
Appearance after heat resistance test:
  Observed the appearance of cured specimens after 150 hours in 120° C. hot air oven aging.
Storage stability of coating compositions:
  Observed the state of the coating compositions to determine if they were gelled or not after 4 weeks storage at 5° C. in a refrigerator.

TABLE I

|  | Appearance of cured film | Haze value after Taber abrasion test (%) | Adhesion property | Appearance after heat resistance test | Storage stability of coating compositions |
| --- | --- | --- | --- | --- | --- |
| Example 1 | good | 2 | 100/100 | no change | good |
| Example 2 | good | 8 | 100/100 | no change | good |
| Example 3 | good | 3 | 100/100 | no change | good |
| Comparative Example 1 | good | 3 | 100/100 | no change | gelled |
| Comparative Example 2 | good | 4 | 100/100 | no change | gelled |
| Comparative Example 3 | good | 47 | 100/100 | no change | good |
| Comparative | good | 48 | 100/100 | no change | good |

| | Appearance of cured film | Haze value after Taber abrasion test (%) | Adhesion property | Appearance after heat resistance test | Storage stability of coating compositions |
|---|---|---|---|---|---|
| Example 4 | | | | | |

I claim:

1. A coating composition comprising components:
   (A) 5 to 45% by weight of an organosilanetriol expressed by the formula $R^1Si(OH)_3$, wherein $R^1$ represents a monovalent hydrocarbon group, and/or a partial condensate thereof;
   (B) 45 to 5% by weight as solids of colloidal silica; and
   (C) 40 to 60% by weight of a solvent containing an aliphatic alcohol having from 1 to 6 carbon atoms, and/or ethylene glycol monoethyl ether acetate,
   in an amount such that the total of the above components is 100 parts by weight, and mixed therein
   (D) a catalyst dispersion containing 0.1 to 5 parts by weight of a compound expressed by the formula $(R^2)_4NOCHO$, wherein $R^2$ can be the same or different and represents an alkyl group having carbon number of from 1 to 2, and 100 parts by weight of an aliphatic alcohol having carbon number of from 1 to 6, so long as the compound expressed by the formula $(R^2)_4NOCHO$ is 0.1 to 0.5% by weight to the total solids in the components (A) and (B).

2. A coating composition according to claim 1, wherein an aliphatic alcohol in solvent (C) is isobutyl alcohol.

3. A coating composition according to claim 1 or 2, wherein solvent (C) contains ethylene glycol monoethyl ether acetate.

4. A coating composition according to claim 1, wherein $R^2$ is methyl group.

* * * * *